United States Patent

Akiyama

[11] Patent Number: 6,044,213
[45] Date of Patent: Mar. 28, 2000

[54] PROCESS SIMULATION METHOD FOR CALCULATING A SURFACE OXIDANT CONCENTRATION IN OXIDATION PROCESS

[75] Inventor: Yutaka Akiyama, Tokyo, Japan

[73] Assignee: NEC Corporation, Tokyo, Japan

[21] Appl. No.: 09/065,900

[22] Filed: Apr. 24, 1998

[30] Foreign Application Priority Data

Apr. 24, 1997 [JP] Japan ................................. 9-107030

[51] Int. Cl.$^7$ .................................................. G06F 9/455
[52] U.S. Cl. ...................................................... 395/500.34
[58] Field of Search ....................... 395/500.34; 438/234, 438/430, 451, 440, 767; 216/84

[56] References Cited

U.S. PATENT DOCUMENTS

| | | | |
|---|---|---|---|
| 4,728,619 | 3/1988 | Pfiester et al. ........................... | 438/451 |
| 4,957,873 | 9/1990 | Ojha et al. ............................... | 438/440 |
| 5,328,559 | 7/1994 | Jerman ..................................... | 216/84 |
| 5,674,762 | 10/1997 | See et al. ................................ | 438/234 |
| 5,700,712 | 12/1997 | Schwalke ................................. | 438/430 |
| 5,834,379 | 11/1998 | Shealy et al. ........................... | 438/767 |

FOREIGN PATENT DOCUMENTS

| | | |
|---|---|---|
| 9-17738 | 1/1997 | Japan . |
| 9-81610 | 3/1997 | Japan . |

OTHER PUBLICATIONS

Uchida et al., A Simulation of Plastic Deformation of Silicon During Thermal Oxidation, Jun. 1993, pp. 12.7.1–12.7.4.
Senez et al., Two–Dimensional Simulation of Local Oxidation of Silicon: Calibrated Viscoelastic Flow Analysis, Mar. 1996 pp. 720–731.

*Primary Examiner*—Kevin J. Teska
*Assistant Examiner*—Dan Fiul
*Attorney, Agent, or Firm*—Young & Thompson

[57] ABSTRACT

The present invention provides a method of simulating a process for oxidation of silicon. The method comprises the following steps. A time "t" of oxidation calculation is set at zero. An effective surface oxidant concentration of a silicon surface exposed to an oxygen atmosphere is calculated assuming that a spontaneous silicon oxide film as an initial silicon oxide film extends over the silicon surface. The time "t" of oxidation calculation is forwarded by a predetermined time increment Δt. An oxidation rate is calculated by use of one of the effective surface oxidant concentration and the surface oxidant concentration. A new silicon surface is formed based upon the calculated oxidation rate and the time increment Δt. Variations in thickness of the silicon oxide film over time are found by a deformation calculation. There is verified whether or not the time "t" of oxidation calculation reaches a predetermined end time so that if the time "t" of oxidation calculation reaches the predetermined end time, then a current simulation is ended, while if the time "t" of oxidation calculation does not reach the predetermined end time, then an oxidant diffusion equation is solved for a deformed silicon oxide film to calculate the surface oxidant concentration of the silicon surface to be oxidized. A loop comprising the sequential third to seventh steps is repeated until the time "t" of oxidation calculation reaches the predetermined end time.

87 Claims, 6 Drawing Sheets

PROCESS SIMULATION METHOD FOR CALCULATING A SURFACE OXIDANT CONCENTRATION IN OXIDATION PROCESS

BACKGROUND OF THE INVENTION

The present invention relates to a process simulation method, and more particularly to a process simulation method for calculating a surface oxidant concentration in an oxidation process for fabricating a semiconductor device.

Process simulations are the techniques for prediction of internal physical quantities such as impurity concentration profile of a transistor or shapes thereof by conducting calculations of fabrication processes of the transistor. A process simulator is used for optimization of the transistor to enable the transistor to exhibit best performances. The use of the process simulator results in remarkable reductions in the cost and the time as compared to the experimental manufacturing of a large scale integrated circuit.

The process simulator implements calculations of the fabrication processes of various semiconductor device by use of computer. Optimum simulation models are incorporated for every processes. For example, the process simulation method for the oxidation process is disclosed in VLSI Design/Manufacturing Simulation, 1987, CMC, pp. 51–62, wherein variation in thickness of the silicon oxide film over time is simulated by solving the following equation (1) which has been obtained by differentiating Deal-Grove Equation.

$$DT_{ox}/dt = B/(2T_{ox}^{old} + A) \quad (1)$$

t: oxidation time $T_{ox}$: thickness of oxide film at a current time $T_{ox}^{old}$: thickness of oxide film at an old time A and B: parameters for oxidation rate.

This method is limited to provide a one-dimensional simulation, but is incapable of providing two or three dimensional simulation.

In the actual LIS circuits, it is required to form local oxidation of silicon layer (LOCOS oxide film) or trench isolation for electrical isolations between individual devices which should be integrated. This means that it is also required to conduct two-dimensional process simulations for the LOCOS oxide film or the trench isolation and also conduct two-dimensional simulations for oxidation over the substrate including isolation regions. The two-dimensional process simulation for the LOCOS oxide film is disclosed in "Semiconductor Process Device Simulation Technique", published from Realize Co. pp. 78–89.

FIG. 1 is a flow chart illustrative of the above conventional two-dimensional process simulation method for oxidation. FIG. 2 is a fragmentary cross sectional elevation view illustrative of silicon oxidation processes. The above conventional two-dimensional process simulation method will be described in detail with reference to FIGS. 1 and 2. In a first step 301, the time for calculating the oxidation is set zero. In a second step 302, an initial oxidation film $T_{ox}^{init}$ is given so that an interface of silicon to be oxidized is not made into contact with oxygen atmosphere. This initial oxidation film is required for calculating a surface oxidant concentration in the following third step 303.

In the third step 303, the following oxidant diffusion equation (Laplace equation) in oxide film is solved to find a surface oxidant concentration on an interface between silicon and silicon oxide.

$$D_{ox} \nabla^2 C_{ox} = 0 \quad (2)$$

where $D_{ox}$ is the diffusion coefficient of oxidant in oxide film, $\nabla^2$ is the Laplacean, and $C_{ox}$ is the oxidant concentration.

In the fourth step 304, the oxidation calculating time t is put forwarded by an increment $\Delta t$.

In the fifth step, the silicon surface oxidant concentration $C_{surf}$ is used to solve the following equation to find an oxidation rate $dT_{ox}/dt$ on the silicon surface.

$$dT_{ox}/dt = K \times C_{surf} \quad (3)$$

In the sixth step, based upon the oxidation rate $dT_{ox}/dt$ on the silicon surface and the time increment $\Delta t$, a thickness $\nabla T_{ox}$ of oxidized film is found. Further, $dT_{ox}^{trans}$ is calculated to form a fresh interface between the silicon oxide and silicon as shown in FIG. 2B.

In the seventh step 307, a deformation calculation is made to find the oxide film thickness as shown in FIG. 2C.

In the eighth step 308, it is verified whether the oxidation calculation time reaches a predetermined final time. If verified, then the simulation is finished. If not verified, then the simulation step enters into the next ninth step 309, wherein for the deformed oxide film, the oxidant diffusion equation is solved to calculate the oxidant surface concentration $C_{surf}$ on the silicon surface so that a sequential set of the above steps 304 to 308 is repeated until the oxidation calculation time reaches the predetermined final time.

Since in the above conventional process simulation method, the oxidant diffusion equation in the oxide film in the form of Laplace equation is solved to calculate the surface oxidant concentration on the silicon surface or the interface between the silicon and silicon oxide, it is required that a silicon oxide film having a finite or not zero thickness exists in the initial state where the time is zero. Thus, it is required to provide or deposit an initial silicon oxide film previously. This means that it is necessary to input the data for the initial silicon oxide film by user. This previous depositions of the initial silicon oxide film requires various processings. For example, the actual wafer has a surface irregularity or has convex and concave, for which reason if a uniform-thickness silicon oxide film is deposited as an initial silicon oxide film over the wafer, then at the concave portion deposited silicon oxide films overlapped each other. Such overlap of the deposited silicon oxide films as the initial films should be avoided. The various processings by the user side are required for avoiding the above problems. Otherwise, the process simulator receives the load of processings.

In the above circumstances, it had been required to develop a novel process simulation method free from the above problems.

SUMMARY OF THE INVENTION

Accordingly, it is an object of the present invention to provide a novel process simulation method free from the above problems.

It is a further object of the present invention to provide a novel process simulation method improved in facilitation of operation of the process simulator.

It is a still further object of the present invention to provide a novel process simulation method improved in convenience in use of the process simulator.

It is yet a further object of the present invention to provide a novel process simulation method free from the requirement for deposition of an initial silicon oxide film on a silicon region exposed to an oxygen atmosphere.

The above and other objects, features and advantages of the present invention will be apparent from the following descriptions.

The present invention provides a method of simulating a process for oxidation of silicon. The method comprises the following steps. A time "t" of oxidation calculation is set at zero. An effective surface oxidant concentration of a silicon surface exposed to an oxygen atmosphere is calculated assuming that a spontaneous silicon oxide film as an initial silicon oxide film extends over the silicon surface. The time "t" of oxidation calculation is forwarded by a predetermined time increment Δt. An oxidation rate is calculated by use of one of the effective surface oxidant concentration and the surface oxidant concentration. A new silicon surface is formed based upon the calculated oxidation rate and the time increment Δt. Variations in thickness of the silicon oxide film over time are found by a deformation calculation. There is verified whether or not the time "t" of oxidation calculation reaches a predetermined end time so that if the time "t" of oxidation calculation reaches the predetermined end time, then a current simulation is ended, whilst if the time "t" of oxidation calculation does not reach the predetermined end time, then an oxidant diffusion equation is solved for a deformed silicon oxide film to calculate the surface oxidant concentration of the silicon surface to be oxidized. A loop comprising the sequential third to seventh steps is repeated until the time "t" of oxidation calculation reaches the predetermined end time.

In accordance with the present invention, the presence of the spontaneous silicon oxide film on a part of silicon exposed to an oxygen atmosphere is assumed as an initial silicon oxide film to calculate an effective surface oxidant concentration on the silicon surface to be oxidized. For this reason, it is unnecessary to set or deposit an initial oxide film which isolates an oxidation-intended part of silicon from the oxygen atmosphere, whereby the process simulation is remarkably improved in facilitation of operation of the process simulator and in convenience in use of the process simulator.

BRIEF DESCRIPTION OF THE DRAWINGS

Preferred embodiments according to the present invention will be described in detail with reference to the accompanying drawings.

DISCLOSURE OF THE INVENTION

Figure 1:
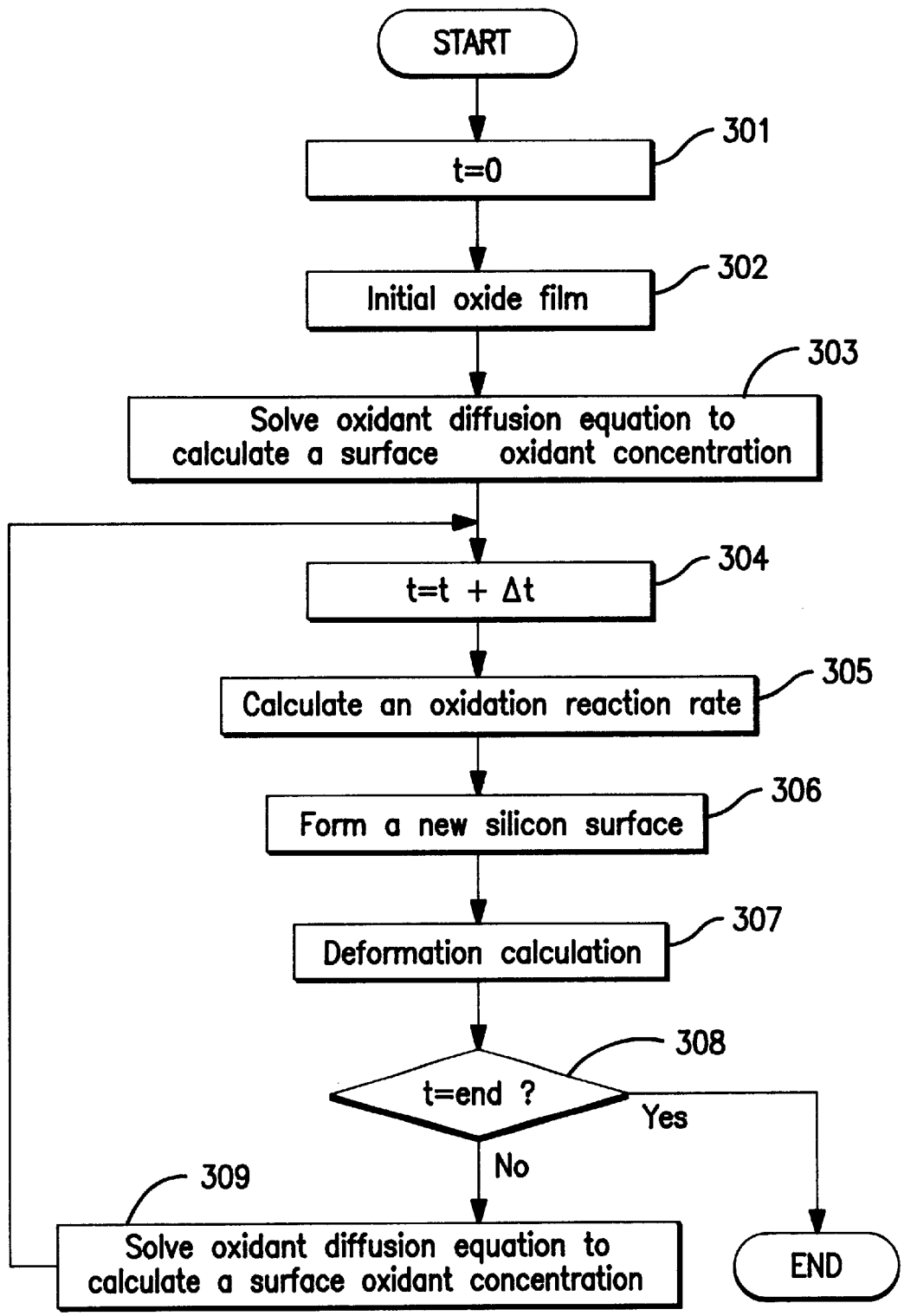
FIG. 1 is a flow chart illustrative of the conventional process simulation method.
Figure 2:
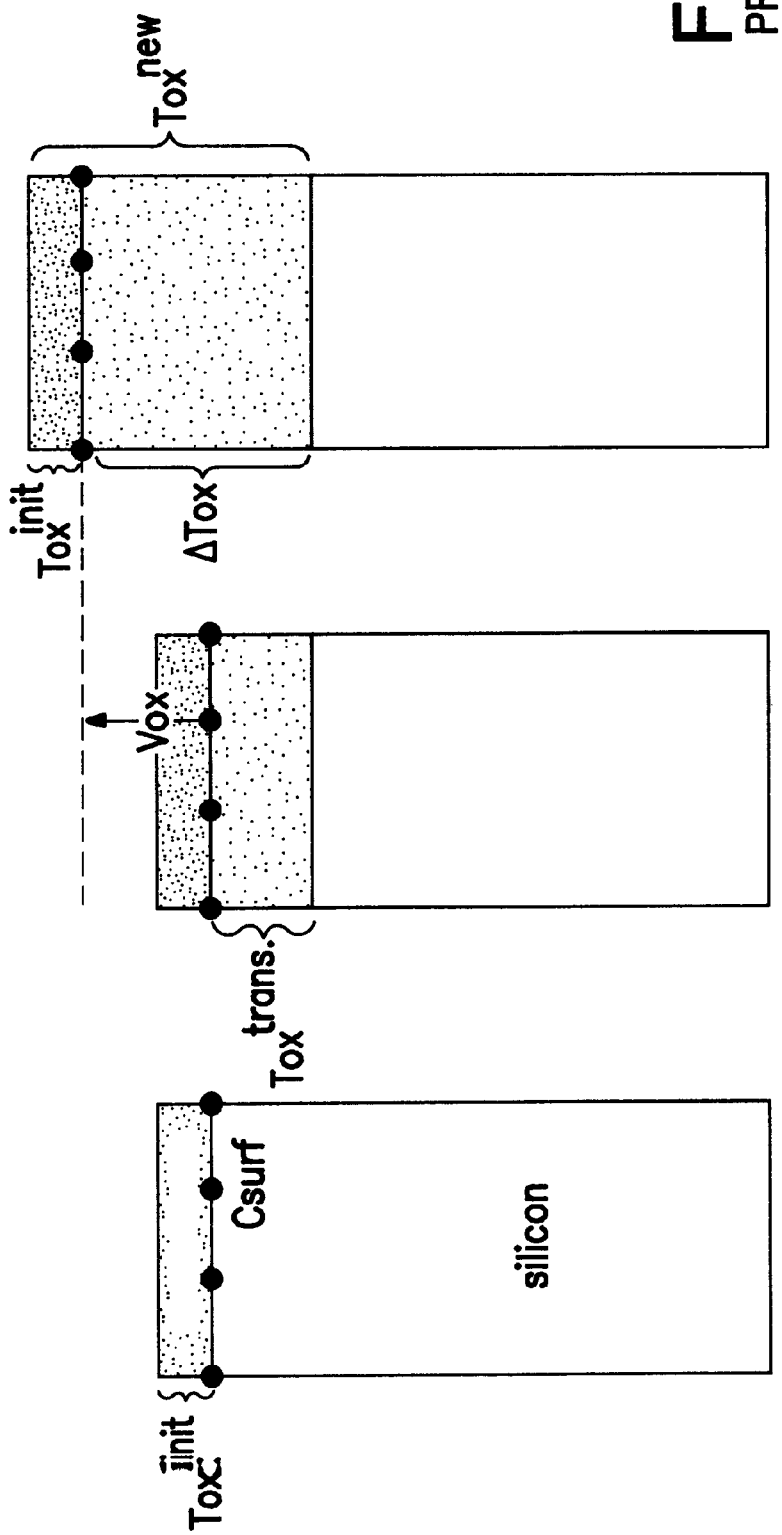
FIG. 2 is a fragmentary cross sectional elevation view illustrative of oxidation process of a silicon surface to be simulated in the conventional process simulation method of FIG. 1.

The first present invention provides a method of simulating a process for oxidation of silicon. The method comprises the following steps. A time "t" of oxidation calculation is set at zero. An effective surface oxidant concentration of a silicon surface exposed to an oxygen atmosphere is calculated assuming that a spontaneous silicon oxide film as an initial silicon oxide film extends over the silicon surface. The time "t" of oxidation calculation is forwarded by a predetermined time increment Δt. An oxidation rate is calculated by use of one of the effective surface oxidant concentration and the surface oxidant concentration. A new silicon surface is formed based upon the calculated oxidation rate and the time increment Δt. Variations in thickness of the silicon oxide film over time are found by a deformation calculation. There is verified whether or not the time "t" of oxidation calculation reaches a predetermined end time so that if the time "t" of oxidation calculation reaches the predetermined end time, then a current simulation is ended, whilst if the time "t" of oxidation calculation does not reach the predetermined end time, then an oxidant diffusion equation is solved for a deformed silicon oxide film to calculate the surface oxidant concentration of the silicon surface to be oxidized. A loop comprising the sequential third to seventh steps is repeated until the time "t" of oxidation calculation reaches the predetermined end time.

In accordance with the first present invention, the presence of the spontaneous silicon oxide film on a part of silicon exposed to an oxygen atmosphere is assumed as an initial silicon oxide film to calculate an effective surface oxidant concentration on the silicon surface to be oxidized. For this reason, it is unnecessary to set or deposit an initial oxide film which isolates an oxidation-intended part of silicon from the oxygen atmosphere, whereby the process simulation is remarkably improved in facilitation of operation of the process simulator and in convenience in use of the process simulator.

It is preferable that the effective surface oxidant concentration $C_{surf}^{eff}$ of silicon surface exposed to an oxygen atmosphere is found as an equation:

$$C_{surf}^{eff}=C^*/\{(k/h)+1+(kT_{ox}^{init}/D)\}$$

where $C_{surf}^{eff}$ is the effective surface oxidant concentration, $T_{ox}^{init}$ is a thickness of the spontaneous silicon oxide film, $C^*$ is an oxidant concentration of the oxygen atmosphere over the silicon surface, k and h are predetermined reaction coefficients, and D is a diffusion coefficient of oxidant into a silicon oxide film.

It is also preferable that the effective surface oxidant concentration $C_{surf}^{eff}$ of silicon surface exposed to an oxygen atmosphere is found as an equation:

$$C_{surf}^{eff}=C^*/\{1+(kT_{ox}^{init}/D)\}$$

where $C_{surf}^{eff}$ is the effective surface oxidant concentration, $T_{ox}^{init}$ is a thickness of the spontaneous silicon oxide film, $C^*$ is an oxidant concentration of the oxygen atmosphere over the silicon surface, and D is a diffusion coefficient of oxidant into a silicon oxide film.

It is also preferable that the time increment Δt has previously been determined in consideration of both efficiency and accuracy of an intended simulation.

It is also preferable that the time increment Δt is constant.

It is also preferable that the time increment Δt is varied. In this case, the time increment Δt may be set small in an initial half time period whilst set large in a later half time period.

It is also preferable that the oxidation rate is calculated by an equation given by:

$$dT_{ox}/dt=K\times C_{surf}^{eff}$$

where $C_{surf}^{eff}$ is an effective surface oxidant concentration, K is a constant, and $T_{ox}$ is a thickness of a silicon oxide film.

It is also preferable that the oxidation rate is calculated by an equation given by:

$$dT_{ox}/dt = K \times C_{surf}$$

where $C_{surf}$ is a surface oxidant concentration, K is a constant, and $T_{ox}$ is a thickness of a silicon oxide film.

It is also preferable that a thickness $T_{ox}^{trans}$ of a transition region is given by:

$$T_{ox}^{trans} = T_{ox}^{init} + \alpha \times K \times C_{surf}^{eff} \times \Delta t$$

where $T_{ox}^{trans}$ is a thickness of the transition region, $\alpha$ is a ratio in thickness of silicon to silicon oxide, $T_{ox}^{init}$ is a thickness of the spontaneous silicon oxide film, K is a constant and $C_{surf}^{eff}$ is the effective surface oxidant concentration. In this case, $\alpha$ may be set in the range of 0.44±10%.

It is also preferable that a thickness $T_{ox}^{trans}$ of a transition region is given by:

$$T_{ox}^{trans} = T_{ox}^{init} + \alpha \times K \times C_{surf} \times \Delta t$$

where $T_{ox}^{trans}$ is a thickness of the transition region, $\alpha$ is a ratio in thickness of silicon to silicon oxide, $T_{ox}^{init}$ is a thickness of the spontaneous silicon oxide film, K is a constant and $C_{surf}$ is a surface oxidant concentration. In this case, $\alpha$ may be set in the range of 0.44±10%.

The second present invention provides a method of simulating a process for oxidation of silicon. The method comprises the following steps. A time "t" of oxidation calculation is set at zero. Both a surface oxidant concentration of a silicon surface for its part thereof unexposed to an oxygen atmosphere and an effective surface oxidant concentration of the silicon surface for its another part exposed to the oxygen atmosphere are calculated, assuming that a spontaneous silicon oxide film as an initial silicon oxide film extends over the silicon surface. The time "t" of oxidation calculation is forwarded by a predetermined time increment $\Delta t$. An oxidation rate is calculated by use of the effective surface oxidant concentration. A new silicon surface is formed based upon the calculated oxidation rate and the time increment $\Delta t$. Variations in thickness of the silicon oxide film over time are founded by a deformation calculation. There is verified whether or not the time "t" of oxidation calculation reaches a predetermined end time so that if the time "t" of oxidation calculation reaches the predetermined end time, then a current simulation is ended, whilst if the time "t" of oxidation calculation does not reach the predetermined end time, then an oxidant diffusion equation is solved for a deformed silicon oxide film to calculate the surface oxidant concentration of the silicon surface to be oxidized. A loop comprising the sequential third to seventh steps is repeated until the time "t" of oxidation calculation reaches the predetermined end time.

In accordance with the second present invention, the presence of the spontaneous silicon oxide film on a part of silicon exposed to an oxygen atmosphere is assumed as an initial silicon oxide film to calculate an effective surface oxidant concentration on the silicon surface to be oxidized. For this reason, it is unnecessary to set or deposit an initial oxide film which isolates an oxidation-intended part of silicon from the oxygen atmosphere, whereby the process simulation is remarkably improved in facilitation of operation of the process simulator and in convenience in use of the process simulator.

It is preferable to further comprises the step of conducting, after the fourth step, a calculation for a maximum rate of oxidation reaction at points where a plurality of definitions for rate of oxidation reaction are given on the same coordinates.

It is also preferable that the surface oxidant concentration is calculated by solving an oxidant diffusion equation given by:

$$D_{ox} \nabla^2 C_{ox} = dC_{ox}/dt$$

where $D_{ox}$ is the diffusion coefficient of oxidant in oxide film, $\nabla^2$ is the Laplacean, and $C_{ox}$ is the oxidant concentration.

It is also preferable that the oxidant diffusion equation is approximated to be $D_{ox} \nabla^2 C_{ox} \approx 0$.

It is also preferable that the effective surface oxidant concentration $C_{surf}^{eff}$ of silicon surface exposed to the oxygen atmosphere is found as an equation:

$$C_{surf}^{eff} = C^* / \{(k/h) + 1 + (kT_{ox}^{init}/D)\}$$

where $C_{surf}^{eff}$ is the effective surface oxidant concentration, $T_{ox}^{init}$ is a thickness of the spontaneous silicon oxide film, $C^*$ is an oxidant concentration of the oxygen atmosphere over the silicon surface, k and h are predetermined reaction coefficients, and D is a diffusion coefficient of oxidant into a silicon oxide film.

It is also preferable that the effective surface oxidant concentration $C_{surf}^{eff}$ of silicon surface exposed to an oxygen atmosphere is found as an equation:

$$C_{surf}^{eff} = C^* / \{1 + (kT_{ox}^{init}/D)\}$$

where $C_{surf}^{eff}$ is the effective surface oxidant concentration, $T_{ox}^{init}$ is a thickness of the spontaneous silicon oxide film, $C^*$ is an oxidant concentration of the oxygen atmosphere over the silicon surface, and D is a diffusion coefficient of oxidant into a silicon oxide film.

It is also preferable that the time increment $\Delta t$ has previously been determined in consideration of both efficiency and accuracy of an intended simulation.

It is also preferable that the time increment $\Delta t$ is constant.

It is also preferable that the time increment $\Delta t$ is varied. Inthis case, the time increment $\Delta t$ may be set small in an initial half time period whilst set large in a later half time period.

It is also preferable that the oxidation rate is calculated by an equation given by:

$$dT_{ox}/dt = K \times C_{surf}^{eff}$$

where $C_{surf}^{eff}$ is the effective surface oxidant concentration, K is a constant, and $T_{ox}$ is a thickness of a silicon oxide film.

It is also preferable that the oxidation rate is calculated by an equation given by:

$$dT_{ox}/dt = K \times C_{surf}$$

where $C_{surf}$ is the surface oxidant concentration, K is a constant, and $T_{ox}$ is a thickness of a silicon oxide film.

It is also preferable that a thickness $T_{ox}^{trans}$ of a transition region is given by:

$$T_{ox}^{trans} = T_{ox}^{init} + \alpha \times K \times C_{surf}^{eff} \times \Delta t$$

where $T_{ox}^{tran}$ is a thickness of the transition region, $\alpha$ is a ratio in thickness of silicon to silicon oxide, $T_{ox}^{init}$ is a thickness of the spontaneous silicon oxide film, K is a constant and $C_{surf}^{eff}$ is the effective surface oxidant concentration. In this case, $\alpha$ may be set in the range of 0.44±10%.

It is also preferable that a thickness $T_{ox}^{trans}$ of a transition region is given by:

$$T_{ox}{}^{trans}=T_{ox}{}^{init}+\alpha \times K \times C_{surf} \times \Delta t$$

where $T_{ox}{}^{trans}$ is a thickness of the transition region, $\alpha$ is a ratio in thickness of silicon to silicon oxide, $T_{ox}{}^{init}$ is a thickness of the spontaneous silicon oxide film, K is a constant and $C_{surf}$ is a surface oxidant concentration. In this case, $\alpha$ may be set in the range of 0.44±10%.

The third present invention provides a computer-readable storage medium having stored a computer program for simulating a process for oxidation of silicon. The computer program includes tie following steps. A time "t" of oxidation calculation is set at zero. An effective surface oxidant concentration of a silicon surface exposed to an oxygen atmosphere is calculated assuming that a spontaneous silicon oxide film as an initial silicon oxide film extends over the silicon surface. The time "t" of oxidation calculation is forwarded by a predetermined time increment $\Delta t$. An oxidation rate is calculated by use of one of the effective surface oxidant concentration and the surface oxidant concentration. A new silicon surface is formed based upon the calculated oxidation rate and the time increment $\Delta t$. Variations in thickness of the silicon oxide film over time are found by a deformation calculation. There is verified whether or not the time "t" of oxidation calculation reaches a predetermined end time so that if the time "t" of oxidation calculation reaches the predetermined end time, then a current simulation is ended, whilst if the time "t" of oxidation calculation does not reach the predetermined end time, then an oxidant diffusion equation is solved for a deformed silicon oxide film to calculate the surface oxidant concentration of the silicon surface to be oxidized. A loop comprising the sequential third to seventh steps is repeated until the time "t" of oxidation calculation reaches the predetermined end time.

In accordance with the third present invention, the presence of the spontaneous silicon oxide film on a part of silicon exposed to an oxygen atmosphere is assumed as an initial silicon oxide film to calculate an effective surface oxidant concentration on the silicon surface to be oxidized. For this reason, it is unnecessary to set or deposit an initial oxide film which isolates an oxidation-intended part of silicon from the oxygen atmosphere, whereby the process simulation is remarkably improved in facilitation of operation of the process simulator and in convenience in use of the process simulator.

It is preferable that the effective surface oxidant concentration $C_{surf}{}^{eff}$ of silicon surface exposed to an oxygen atmosphere is found as an equation:

$$C_{surf}{}^{eff}=C^*/\{(k/h)+1+(kT_{ox}{}^{init}/D)\}$$

where $C_{surf}{}^{eff}$ is the effective surface oxidant concentration, $T_{ox}{}^{init}$ is a thickness of the spontaneous silicon oxide film, $C^*$ is an oxidant concentration of the oxygen atmosphere over the silicon surface, k and h are predetermined reaction coefficients, and D is a diffusion coefficient of oxidant into a silicon oxide film.

It is also preferable that the effective surface oxidant concentration $C_{surf}{}^{eff}$ of silicon surface exposed to an oxygen atmosphere is found as an equation:

$$C_{surf}{}^{eff}=C^*/\{1+(kT_{ox}{}^{init}/D)\}$$

where $C_{surf}{}^{eff}$ is the effective surface oxidant concentration, $T_{ox}{}^{init}$ is a thickness of the spontaneous silicon oxide film, $C^*$ is an oxidant concentration of the oxygen atmosphere over the silicon surface, and D is a diffusion coefficient of oxidant into a silicon oxide film.

It is also preferable that the time increment $\Delta t$ has previously been determined in consideration of both efficiency and accuracy of an intended simulation.

It is also preferable that the time increment $\Delta t$ is constant.

It is also preferable that the time increment $\Delta t$ is varied. In this case, the time increment $\Delta t$ may be set small in an initial half time period whilst set large in a later half time period.

It is also preferable that the oxidation rate is calculated by an equation given by:

$$dT_{ox}/dt=K \times C_{surf}{}^{eff}$$

where $C_{surf}{}^{eff}$ is an effective surface oxidant concentration, K is a constant, and $T_{ox}$ is a thickness of a silicon oxide film.

It is also preferable that the oxidation rate is calculated by an equation given by:

$$dT_{ox}/dt=K \times C_{surf}$$

where $C_{surf}$ is a surface oxidant concentration, K is a constant, and $T_{ox}$ is a thickness of a silicon oxide film.

It is also preferable that a thickness $T_{ox}{}^{trans}$ of a transition region is given by:

$$T_{ox}{}^{trans}=T_{ox}{}^{init}+\alpha \times K \times C_{surf}{}^{eff} \times \Delta t$$

where $T_{ox}{}^{trans}$ is a thickness of the transition region, $\alpha$ is a ratio in thickness of silicon to silicon oxide, $T_{ox}{}^{init}$ is a thickness of the spontaneous silicon oxide film, K is a constant and $C_{surf}{}^{eff}$ is the effective surface oxidant concentration. In this case, $\alpha$ may be set in the range of 0.44±10%.

It is also preferable that a thickness $T_{ox}{}^{trans}$ of a transition region is given by:

$$T_{ox}{}^{trans}=T_{ox}{}^{init}+\alpha \times K \times C_{surf} \times \Delta t$$

where $T_{ox}{}^{trans}$ is a thickness of the transition region, $\alpha$ is a ratio in thickness of silicon to silicon oxide, $T_{ox}{}^{init}$ is a thickness of the spontaneous silicon oxide film, K is a constant and $C_{surf}$ is a surface oxidant concentration. In this case, $\alpha$ may be set in the range of 0.44±10%.

The fourth present invention provides a computer-readable storage medium having stored a computer program for simulating a process for oxidation of silicon. The computer program includes the following steps. A time "t" of oxidation calculation is set at zero. Both a surface oxidant concentration of a silicon surface for its part thereof unexposed to an oxygen atmosphere and an effective surface oxidant concentration of the silicon surface for its another part exposed to the oxygen atmosphere are calculated, assuming that a spontaneous silicon oxide film as an initial silicon oxide film extends over the silicon surface. The time "t" of oxidation calculation is forwarded by a predetermined time increment $\Delta t$. An oxidation rate is calculated by use of the effective surface oxidant concentration. A new silicon surface is formed based upon the calculated oxidation rate and the time increment $\Delta t$. Variations in thickness of the silicon oxide film over time are founded by a deformation calculation. There is verified whether or not the time "t" of oxidation calculation reaches a predetermined end time so that if the time "t" of oxidation calculation reaches the predetermined end time, then a current simulation is ended, whilst if the time "t" of oxidation calculation does not reach the predetermined end time, then an oxidant diffusion equation is solved for a deformed silicon oxide film to calculate the surface oxidant concentration of the silicon surface to be oxidized. A loop comprising the sequential third to seventh steps is repeated until the time "t" of oxidation calculation reaches the predetermined end time.

In accordance with the fourth present invention, the presence of the spontaneous silicon oxide film on a part of silicon exposed to an oxygen atmosphere is assumed as an initial silicon oxide film to calculate an effective surface oxidant concentration on the silicon surface to be oxidized. For this reason, it is unnecessary to set or deposit an initial oxide film which isolates an oxidation-intended part of silicon from the oxygen atmosphere, whereby the process simulation is remarkably improved in facilitation of operation of the process simulator and in convenience in use of the process simulator.

It is preferable that the computer program further includes the step of conducting, after the fourth step, a calculation for a maximum rate of oxidation reaction at points where a plurality of definitions for rate of oxidation reaction are given on the same coordinates.

It is also preferable that the surface oxidant concentration is calculated by solving an oxidant diffusion equation given by:

$$D_{ox}\nabla^2 C_{ox} = dC_{ox}/dt$$

where $D_{ox}$ is the diffusion coefficient of oxidant in oxide film, $\nabla^2$ is the Laplacean, and $C_{ox}$ is the oxidant concentration. In this case, the oxidant diffusion equation may be approximated to be $D_{ox}\nabla^2 C_{ox} \approx 0$.

It is also preferable that the effective surface oxidant concentration $C_{surf}^{eff}$ of silicon surface exposed to the oxygen atmosphere is found as an equation:

$$C_{surf}^{eff} = C^* / \{(k/h) + 1 + (kT_{ox}^{init}/D)\}$$

where $C_{surf}^{eff}$ is the effective surface oxidant concentration, $T_{ox}^{init}$ is a thickness of the spontaneous silicon oxide film, $C^*$ is an oxidant concentration of the oxygen atmosphere over the silicon surface, k and h are predetermined reaction coefficients, and D is a diffusion coefficient of oxidant into a silicon oxide film.

It is also preferable that the effective surface oxidant concentration $C_{surf}^{eff}$ of silicon surface exposed to an oxygen atmosphere is found as an equation:

$$C_{surf}^{eff} = C^* / \{1 + (kT_{oxinit}/D)\}$$

where $C_{surf}^{eff}$ is the effective surface oxidant concentration, $T_{ox}^{init}$ is a thickness of the spontaneous silicon oxide film, $C^*$ is an oxidant concentration of the oxygen atmosphere over the silicon surface, and D is a diffusion coefficient of oxidant into a silicon oxide film.

It is also preferable that the time increment $\Delta t$ has previously been determined in consideration of both efficiency and accuracy of an intended simulation.

It is also preferable that the time increment $\Delta t$ is constant.

It is also preferable that the time increment $\Delta t$ is varied. In this case, the time increment $\Delta t$ may be set small in an initial half time period whilst set large in a later half time period.

It is also preferable that the oxidation rate is calculated by an equation given by:

$$dT_{ox}/dt = K \times C_{surf}^{eff}$$

where $C_{surf}^{eff}$ is the effective surface oxidant concentration, K is a constant, and $T_{ox}$ is a thickness of a silicon oxide film.

It is also preferable that the oxidation rate is calculated by an equation given by:

$$dT_{ox}/dt = K \times C_{surf}$$

where $C_{surf}$ is the surface oxidant concentration, K is a constant, and $T_{ox}$ is a thickness of a silicon oxide film.

It is also preferable that a thickness $T_{ox}^{trans}$ of a transition region is given by:

$$T_{ox}^{trans} = T_{ox}^{init} + \alpha \times K \times C_{surf}^{eff} \times \Delta t$$

where $T_{ox}^{trans}$ is a thickness of the transition region, $\alpha$ is a ratio in thickness of silicon to silicon oxide, $T_{ox}^{init}$ is a thickness of the spontaneous silicon oxide film, K is a constant and $C_{surf}^{eff}$ is the effective surface oxidant concentration. In this case, $\alpha$ may be set in the range of 0.44±10%.

It is also preferable that a thickness $T_{ox}^{trans}$ of a transition region is given by:

$$T_{ox}^{trans} = T_{ox}^{init} + \alpha \times K \times C_{surf} \times \Delta t$$

where $T_{ox}^{trans}$ is a thickness of the transition region, $\alpha$ is a ratio in thickness of silicon to silicon oxide, $T_{ox}^{init}$ is a thickness of the spontaneous silicon oxide film, K is a constant and $C_{surf}$ is a surface oxidant concentration. In this case, $\alpha$ may be set in the range of 0.44±10%.

The fifth present invention provides a process simulator for a simulation of a process for oxidation of silicon. The process simulator includes a processing unit and a storage unit which has stored a computer program for causing the processing unit to perform the simulation by the following steps. A time "t" of oxidation calculation is set at zero. An effective surface oxidant concentration of a silicon surface exposed to an oxygen atmosphere is calculated assuming that a spontaneous silicon oxide film as an initial silicon oxide film extends over the silicon surface. The time "t" of oxidation calculation is forwarded by a predetermined time increment $\Delta t$. An oxidation rate is calculated by use of one of the effective surface oxidant concentration and the surface oxidant concentration. A new silicon surface is formed based upon the calculated oxidation rate and the time increment $\Delta t$. Variations in thickness of the silicon oxide film over time are found by a deformation calculation. There is verified whether or not the time "t" of oxidation calculation reaches a predetermined end time so that if the time "t" of oxidation calculation reaches the predetermined end time, then a current simulation is ended, whilst if the time "t" of oxidation calculation does not reach the predetermined end time, then an oxidant diffusion equation is solved for a deformed silicon oxide film to calculate the surface oxidant concentration of the silicon surface to be oxidized. A loop comprising the sequential third to seventh steps is repeated until the time "t" of oxidation calculation reaches the predetermined end time.

In accordance with the fifth present invention, the presence of the spontaneous silicon oxide film on a part of silicon exposed to an oxygen atmosphere is assumed as an initial silicon oxide film to calculate an effective surface oxidant concentration on the silicon surface to be oxidized. For this reason, it is unnecessary to set or deposit an initial oxide film which isolates an oxidation-intended part of silicon from the oxygen atmosphere, whereby the process simulation is remarkably improved in facilitation of operation of the process simulator and in convenience in use of the process simulator.

It is preferable that the effective surface oxidant concentration $C_{surf}^{eff}$ of silicon surface exposed to an oxygen atmosphere is found as an equation:

$$C_{surf}^{eff} = C^* / \{(k/h) + 1 + (kT_{ox}^{init}/D)\}$$

where $C_{surf}^{eff}$ is the effective surface oxidant concentration, $T_{ox}^{init}$ is a thickness of the spontaneous silicon oxide film, $C^*$ is an oxidant concentration of the oxygen atmosphere over the silicon surface, k and h are predetermined reaction coefficients, and D is a diffusion coefficient of oxidant into a silicon oxide film.

It is also preferable that the effective surface oxidant concentration $C_{surf}^{eff}$ of silicon surface exposed to an oxygen atmosphere is found as an equation:

$$C_{surf}^{eff}=C^*/\{1+(kT_{ox}^{init}/D)\}$$

where $C_{surf}^{eff}$ is the effective surface oxidant concentration, $T_{ox}^{init}$ is a thickness of the spontaneous silicon oxide film, $C^*$ is an oxidant concentration of the oxygen atmosphere over the silicon surface, and D is a diffusion coefficient of oxidant into a silicon oxide film.

It is also preferable that the time increment $\Delta t$ has previously been determined in consideration of both efficiency and accuracy of an intended simulation.

It is also preferable that the time increment $\Delta t$ is constant.

It is also preferable that the time increment $\Delta t$ is varied. In this case, the time increment $\Delta t$ may be set small in an initial half time period whilst set large in a later half time period.

It is also preferable that the oxidation rate is calculated by an equation given by:

$$dT_{ox}/dt=K\times C_{surf}^{eff}$$

where $C_{surf}^{eff}$ is an effective surface oxidant concentration, K is a constant, and $T_{ox}$ is a thickness of a silicon oxide film.

It is also preferable that the oxidation rate is calculated by an equation given by:

$$dT_{ox}/dt=K\times C_{surf}$$

where $C_{surf}$ is a surface oxidant concentration, K is a constant, and $T_{ox}$ is a thickness of a silicon oxide film.

It is also preferable that a thickness $T_{ox}^{trans}$ of a transition region is given by:

$$T_{ox}^{trans}=T_{ox}^{init}+\alpha\times K\times C_{surf}^{eff}\times\Delta t$$

where $T_{ox}^{trans}$ is a thickness of the transition region, $\alpha$ is a ratio in thickness of silicon to silicon oxide, $T_{ox}^{init}$ is a thickness of the spontaneous silicon oxide film, K is a constant and $C_{surf}^{eff}$ is the effective surface oxidant concentration. In this case, $\alpha$ may be set in the range of 0.44±10%.

It is also preferable that a thickness $T_{ox}^{trans}$ of a transition region is given by:

$$T_{ox}^{trans}=T_{ox}^{init}+\alpha\times K\times C_{surf}\times\Delta t$$

where $T_{ox}^{trans}$ is a thickness of the transition region, $\alpha$ is a ratio in thickness of silicon to silicon oxide, $T_{ox}^{init}$ is a thickness of the spontaneous silicon oxide film, K is a constant and $C_{surf}$ is a surface oxidant concentration. In this case, $\alpha$ may be set in the range of 0.44±10%.

The sixth present invention provides a process simulator for a simulation of a process for oxidation of silicon. The process simulator includes a processing unit and a storage unit which has stored a computer program for causing the processing unit to perform the simulation by the following steps. A time "t" of oxidation calculation is set at zero. Both a surface oxidant concentration of a silicon surface for its part thereof unexposed to an oxygen atmosphere and an effective surface oxidant concentration of the silicon surface for its another part exposed to the oxygen atmosphere are calculated, assuming that a spontaneous silicon oxide film as an initial silicon oxide film extends over the silicon surface. The time "t" of oxidation calculation is forwarded by a predetermined time increment $\Delta t$. An oxidation rate is calculated by use of the effective surface oxidant concentration. A new silicon surface is formed based upon the calculated oxidation rate and the time increment $\Delta t$. Variations in thickness of the silicon oxide film over time are founded by a deformation calculation. There is verified whether or not the time "t" of oxidation calculation reaches a predetermined end time so that if the time "t" of oxidation calculation reaches the predetermined end time, then a current simulation is ended, whilst if the time "t" of oxidation calculation does not reach the predetermined end time, then an oxidant diffusion equation is solved for a deformed silicon oxide film to calculate the surface oxidant concentration of the silicon surface to be oxidized. A loop comprising the sequential third to seventh steps is repeated until the time "t" of oxidation calculation reaches the predetermined end time.

In accordance with the sixth present invention, the presence of the spontaneous silicon oxide film on a part of silicon exposed to an oxygen atmosphere is assumed as an initial silicon oxide film to calculate an effective surface oxidant concentration on the silicon surface to be oxidized. For this reason, it is unnecessary to set or deposit an initial oxide film which isolates an oxidation-intended part of silicon from the oxygen atmosphere, whereby the process simulation is remarkably improved in facilitation of operation of the process simulator and in convenience in use of the process simulator.

It is preferable that the simulation further includes the step of conducting, after the fourth step, a calculation for a maximum rate of oxidation reaction at points where a plurality of definitions for rate of oxidation reaction are given on the same coordinates.

It is also preferable that the surface oxidant concentration is calculated by solving an oxidant diffusion equation given by:

$$D_{ox}\nabla^2 C_{ox}=dC_{ox}/dt$$

where $D_{ox}$ is the diffusion coefficient of oxidant in oxide film, $\nabla^2$ is the Laplacean, and $C_{ox}$ is the oxidant concentration.

It is also preferable that the oxidant diffusion equation is approximated to be $D_{ox}\nabla^2 C_{ox}\approx 0$.

It is also preferable that the effective surface oxidant concentration $C_{surf}^{eff}$ of silicon surface exposed to the oxygen atmosphere is found as an equation:

$$C_{surf}^{eff}=C^*/\{(k/h)+1+(kT_{ox}^{init}/D)\}$$

where $C_{surf}^{eff}$ is the effective surface oxidant concentration, $T_{ox}^{init}$ is a thickness of the spontaneous silicon oxide film, $C^*$ is an oxidant concentration of the oxygen atmosphere over the silicon surface, k and h are predetermined reaction coefficients, and D is a diffusion coefficient of oxidant into a silicon oxide film.

It is also preferable that the effective surface oxidant concentration $C_{surf}^{eff}$ of silicon surface exposed to an oxygen atmosphere is found as an equation:

$$C_{surf}^{eff}=C^*/\{1+(kT_{ox}^{init}/D)\}$$

where $C_{surf}^{eff}$ is the effective surface oxidant concentration, $T_{ox}^{init}$ is a thickness of the spontaneous silicon oxide film, $C^*$ is an oxidant concentration of the oxygen atmosphere over the silicon surface, and D is a diffusion coefficient of oxidant into a silicon oxide film.

It is also preferable that the time increment $\Delta t$ has previously been determined in consideration of both efficiency and accuracy of an intended simulation.

It is also preferable that the time increment $\Delta t$ is constant.

It is also preferable that the time increment $\Delta t$ is varied. In this case, the time increment $\Delta t$ may be set small in an initial half time period whilst set large in a later half time period.

It is also preferable that the oxidation rate is calculated by an equation given by $$dT_{ox}/dt = K \times C_{surf}^{eff}$$

where $C_{surf}^{eff}$ is the effective surface oxidant concentration, K is a constant, and $T_{ox}$ is a thickness of a silicon oxide film.

It is also preferable that the oxidation rate is calculated by an equation given by:

$$dT_{ox}/dt = K \times C_{surf}$$

where $C_{surf}$ is the surface oxidant concentration, K is a constant, and $T_{ox}$ is a thickness of a silicon oxide film.

It is also preferable that a thickness $T_{ox}^{trans}$ of a transition region is given by:

$$T_{ox}^{trans} = T_{ox}^{init} + \alpha \times K \times C_{surf}^{eff} \times \Delta t$$

where $T_{ox}^{trans}$ is a thickness of the transition region, $\alpha$ is a ratio in thickness of silicon to silicon oxide, $T_{ox}^{init}$ is a thickness of the spontaneous silicon oxide film, K is a constant and $C_{surf}^{eff}$ is the effective surface oxidant concentration. In this case, $\alpha$ may be set in the range of 0.44±10%.

It is also preferable that a thickness $T_{ox}^{trans}$ of a transition region is given by:

$$T_{ox}^{trans} = T_{ox}^{init} + \alpha \times K \times C_{surf} \times \Delta t$$

where $T_{ox}^{trans}$ is a thickness of the transition region, $\alpha$ is a ratio in thickness of silicon to silicon oxide, $T_{ox}^{init}$ is a thickness of the spontaneous silicon oxide film, K is a constant and $C_{surf}$ is a surface oxidant concentration. In this case, $\alpha$ may be set in the range of 0.44±10%.

PREFERRED EMBODIMENTS

Figure 3:
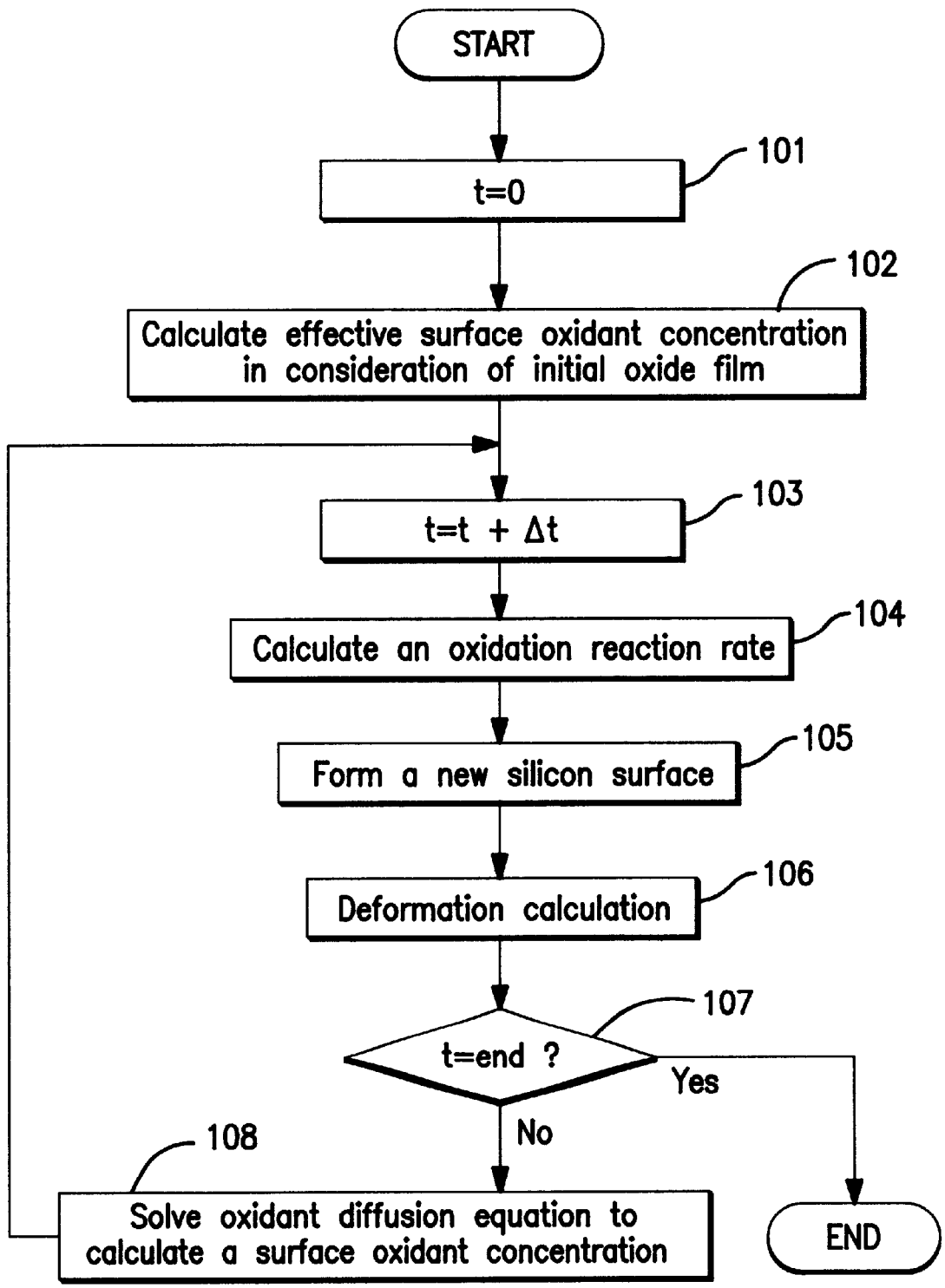
FIG. 3 is a flow chart illustrative of a novel process simulation method in a first embodiment in accordance with the present invention.

First Embodiment:

A first embodiment according to the present invention will be described in detail with reference to FIGS. 3 and 4. FIG. 3 is a flow chart illustrative of a novel process simulation method in oxidation process for formation of a semiconductor device, provided that an entire surface of silicon is exposed to an oxygen atmosphere. The novel process simulation method comprises the following steps.

In a first step 101, a time "t" of oxidation calculation is set at zero.

In a second step 102, if a silicon surface to be oxidized is exposed to an oxygen atmosphere, then an effective surface oxidant concentration is calculated in consideration of an initial silicon oxide film, wherein a presence of a spontaneous silicon oxide film having a thickness of $T_{ox}^{init}$ over silicon is assumed so that a surface oxidant concentration $C_{surf}^{eff}$ of silicon surface exposed to an oxygen atmosphere is found as the following equation by solving an equivalent equation to one-dimensional Deal-Grove equation.

$$C_{surf}^{eff} = C^*/\{(k/h) + 1 + (kT_{ox}^{init}/D)\} \quad (4)$$

where $C^*$ is the oxidant concentration of an atmosphere over a silicon surface, k and h are the reaction coefficients, D is the diffusion coefficient of oxidant into a silicon oxide film and $T_{ox}^{init}$ is the thickness of the spontaneous silicon oxide film as the initial silicon oxide film. It may, for example, be possible that the thickness $T_{ox}^{init}$ is assumed to be 20 angstroms.

As a miner modification, it is also possible to approximate the above equation (4) as follows, provided that a value of the term "k/h" is extremely small.

$$C_{surf}^{eff} = C^*/\{1 + (kT_{ox}^{init}/D)\} \quad (4').$$

In a third step 103, the time "t" of oxidation calculation is forwarded by a predetermined time increment $\Delta t$, wherein $\Delta t$ has previously been determined in consideration of both efficiency and accuracy of an intended simulation. For example, in case of a thermal oxidation process for one hour, the time increment $\Delta t$ may be determined to be 5 minutes. This time increment $\Delta t$ may be determined to be constant or may be varied. It is, for example, possible that the time increment $\Delta t$ is relatively small in the initial half time period whilst relatively large in the later half time period.

In a fourth step 104, the surface oxidant concentration $C_{surf}^{eff}$ of silicon surface is used to solve the following equation in order to calculate an oxidation rate $dT_{ox}/dt(V_{ox})$.

$$dT_{ox}/dt = K \times C_{surf}^{eff} \quad (5)$$

In other cases than having initially entered into this fourth step 104, the following equation is used to calculate the oxidation rate $dT_{ox}/dt$ ($V_{ox}$).

$$dT_{ox}/dt = K \times C_{surf} \quad (5')$$

Figure 4:
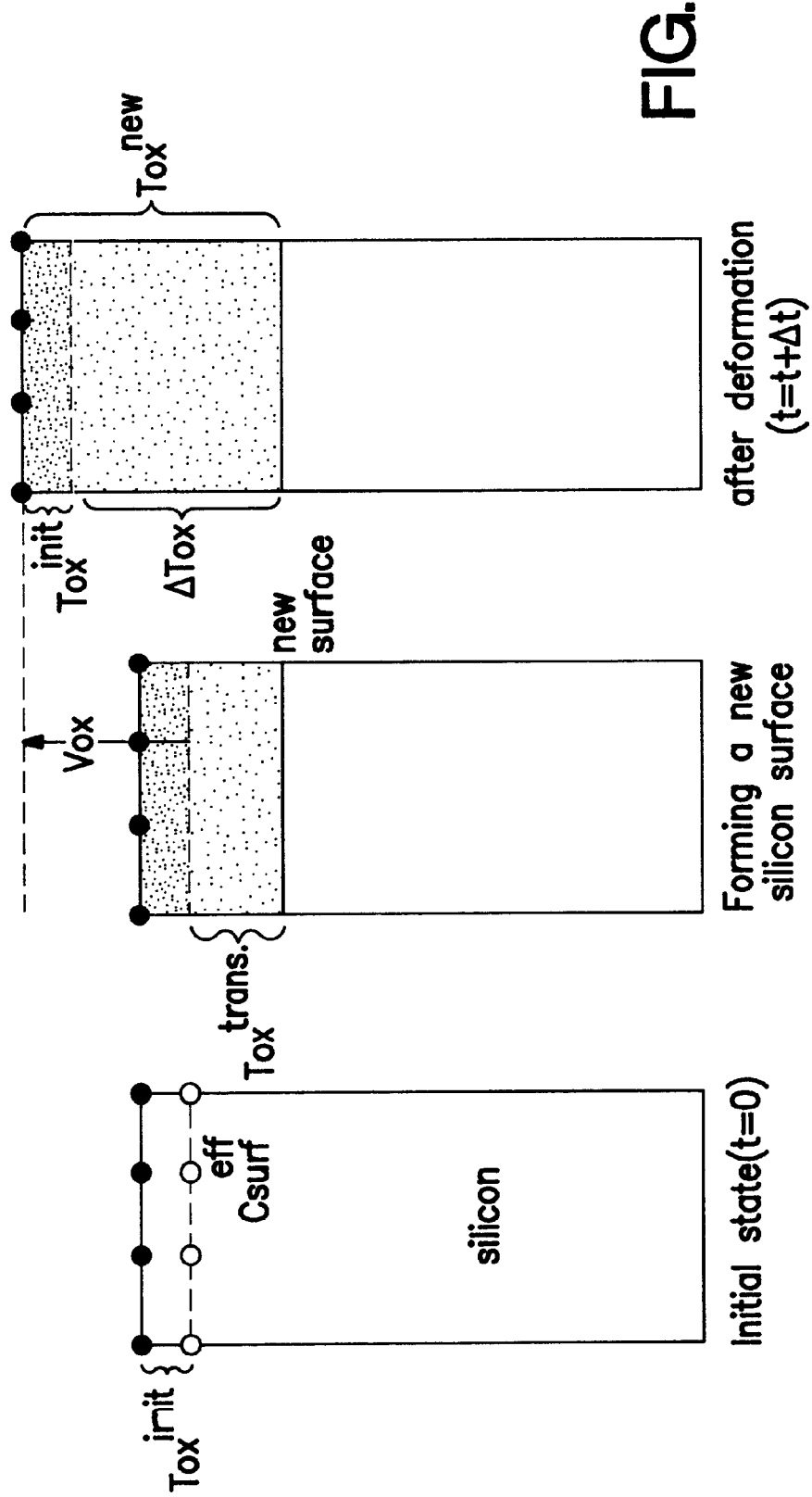
FIG. 4 is a fragmentary cross sectional elevation view illustrative of oxidation process of a silicon surface to be simulated in a novel process simulation method of FIG. 3.

In a fifth step 105, a new silicon surface is formed based upon the calculated oxidation rate $dT_{ox}/dt(V_{ox})$ and the time increment $\Delta t$ as shown in FIG. 4, whereby the spontaneous silicon oxide film is absorbed into a transition region. A thickness $T_{ox}^{trans}$ of the transition region is given by the following equation.

$$T_{ox}^{trans} = T_{ox}^{init} + 0.44 \times \Delta T_{ox} \quad (6)$$

$$= T_{ox}^{init} + 0.44 \times K \times C_{surf}^{eff} \times \Delta t \quad (7)$$

where 0.44 is a typical value as a ratio in thickness of silicon to be oxidized to silicon oxide. This value 0.44 might be varied in the range of 0.44±10% under various conditions. The value in the range of 0.44±10% may be available as the coefficient in the above equation (7).

In other cases than having initially entered into this fifth step 105, the following equations are used in place of the above equations (6) and (7).

$$T_{ox}^{trans} = T_{ox}^{init} + 0.44 \times \Delta T_{ox} \quad (6')$$

$$= T_{ox}^{init} + 0.44 \times K \times C_{surf} \times \Delta t \quad (7')$$

where 0.44 is a typical value as a ratio in thickness of silicon to be oxidized to silicon oxide. This value 0.44 might be varied in the range of 0.44±10% under various conditions. The value in the range of 0.44±10% may be available as the coefficient in the above equation (7').

In a sixth step 106, a calculation for deformation is implemented to find a variation in thickness of a silicon oxide film for every one hour as shown in FIG. 4.

In a seventh step 107, it is verified whether or not the time "t" of oxidation calculation reaches a predetermined end time. If the time "t" of oxidation calculation reaches the predetermined end time, then the above process simulation is ended. If, however, the time "t" of oxidation calculation does not reach the predetermined end time, then the process simulation enters into an eight step 108.

In the eight step 108, the oxidant diffusion equation is solved for the deformed silicon oxide film to calculate the surface oxidant concentration $C_{surf}$ of the silicon surface to be oxidized before returning to the above third step 103. A loop comprising the sequential steps 103 through 108 is repeated until the time "t" of oxidation calculation reaches the predetermined end time.

As described above, the presence of the spontaneous silicon oxide film on a part of silicon exposed to an oxygen atmosphere is assumed as an initial silicon oxide film to calculate an effective surface oxidant concentration on the silicon surface to be oxidized. For this reason, it is unnecessary to set or deposit an initial oxide film which isolates an oxidation-intended part of silicon from the oxygen atmosphere, whereby the process simulation is remarkably improved in facilitation of operation of the process simulator and in convenience in use of the process simulator.

Figure 5:
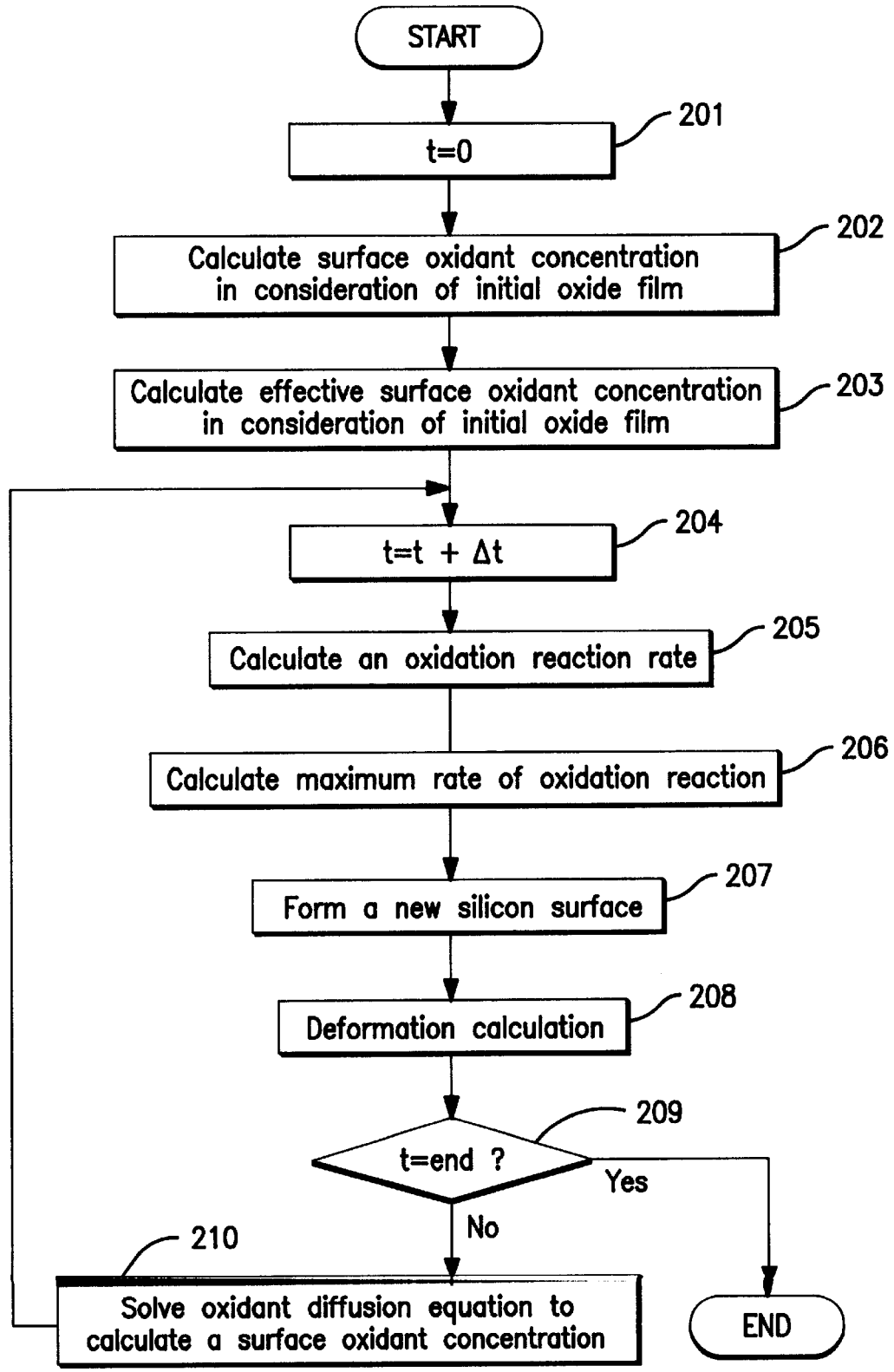
FIG. 5 is a flow chart illustrative of a novel process simulation method in a second embodiment in accordance with the present invention.

Second Embodiment:

A second embodiment according to the present invention will be described in detail with reference to FIGS. 5 and 6. FIG. 5 is a flow chart illustrative of a novel process simulation method in oxidation process for formation of a semiconductor device, provided that a surface of silicon is partially exposed to an oxygen atmosphere. The novel process simulation method comprises the following steps.

In a first step 201, a time "t" of oxidation calculation is set at zero.

In a second step 202, a surface oxidant concentration $C_{surf}$ of a silicon surface is calculated by solving the following oxidant diffusion equation regarding a part of silicon which is not exposed to an oxygen atmosphere.

$$D_{ox}\nabla^2 C_{ox} = dC_{ox}/dt \tag{8}$$

where $D_{ox}$ is the diffusion coefficient of oxidant in oxide film, $\nabla^2$ is the Laplacean, and $C_{ox}$ is the oxidant concentration.

The above equation (8) is approximated as follows.

$$D_{ox}\nabla^2 C_{ox} \approx 0 \tag{8'}$$

where $D_{ox}$ is the diffusion coefficient of oxidant in oxide film, $\nabla^2$ is the Laplacean, and $C_{ox}$ is the oxidant concentration.

In a third step 203, for the remaining part of silicon surface exposed to tie oxygen atmosphere, an effective surface oxidant concentration is calculated in consideration of an initial silicon oxide film, wherein a spontaneous silicon oxide film having a thickness of $T_{ox}^{init}$ is assumed so that a surface oxidant concentration $C_{surf}^{eff}$ of silicon surface exposed to the oxygen atmosphere is found as the following equation by solving an equivalent equation to one-dimensional Deal-Grove equation.

$$C_{surf}^{eff} = C^*/\{(k/h) + 1 + (kT_{ox}^{init}/D)\} \tag{9}$$

where C* is the oxidant concentration of an atmosphere over a silicon surface, k and h are the reaction coefficients, D is the diffusion coefficient of oxidant into a silicon oxide film and $T_{ox}^{init}$ is the thickness of the spontaneous silicon oxide film as the initial silicon oxide film. It may, for example, be possible that the thickness $T_{ox}^{init}$ is assumed to be 20 angstroms.

As a miner modification, it is also possible to approximate the above equation (9) as follows, provided that a value of the term "k/h" is extremely small.

$$C_{surf}^{eff} = C^*/\{1 + (kT_{ox}^{init}/D)\} \tag{9'}$$

As a further modification, it is also possible to reverse the sequence between the second and third steps 202 and 203. Namely, the above third step 203 is executed before the above second step is executed.

In a fourth step 204, the time "t" of oxidation calculation is forwarded by a predetermined time increment Δt, wherein Δt has previously been determined in consideration of both efficiency and accuracy of an intended simulation. For example, in case of a thermal oxidation process for one hour, the time increment Δt may be determined to be 5 minutes. This time increment Δt may be determined to be constant or may be varied. It is, for example, possible that the time increment Δt is relatively small in the initial half time period whilst relatively large in the later half time period.

In a fifth step 205, both the surface oxidant concentration $C_{surf}$ and the effective surface oxidant concentration $C_{surf}^{eff}$ of silicon surface are used to solve the following equations in order to calculate an oxidation rate $dT_{ox}/dt(V_{ox})$.

$$dT_{ox}/dt = K \times C_{surf} \tag{10}$$

$$dT_{ox}/dt = K \times C_{surf}^{eff} \tag{11}$$

By the way, there is raised an issue of how to define an oxidation rate at a boundary point between silicon film and spontaneous silicon oxide film during the transition region formation in this case that the silicon film is partially exposed to the oxygen atmosphere.

Figure 6:
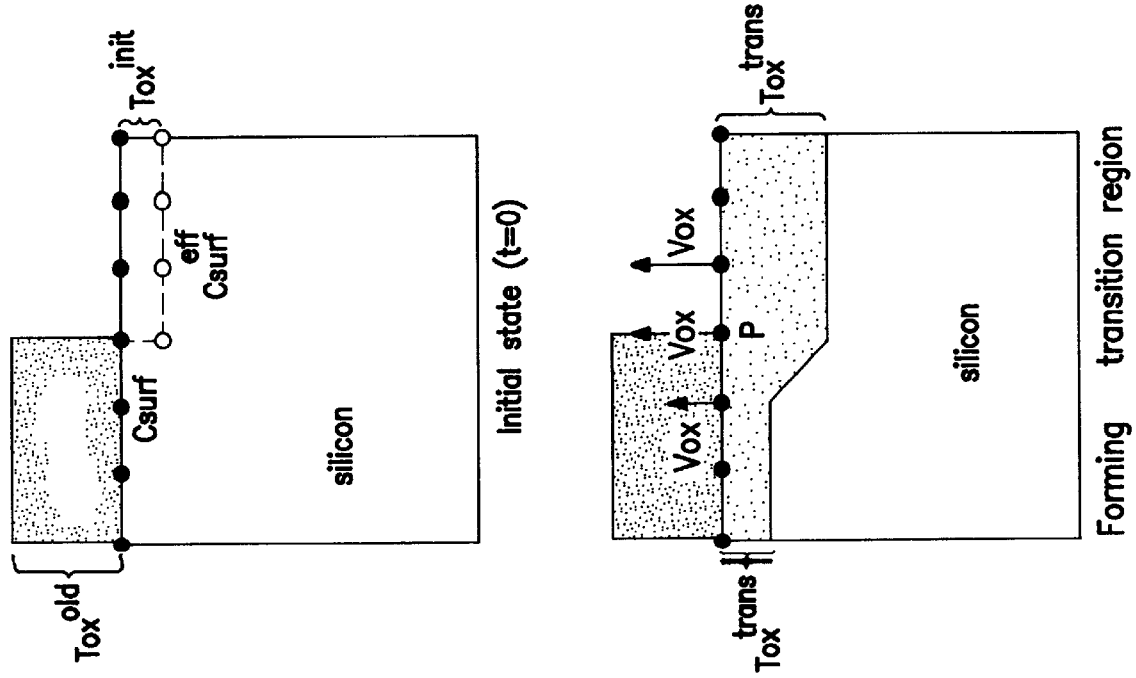
FIG. 6 is a fragmentary cross sectional elevation view illustrative of oxidation process of a silicon surface to be simulated in a novel process simulation method of FIG. 3.

Accordingly, in a sixth step 206, a calculation is made for a maximum rate of oxidation reaction at a point P where on the same coordinates, plural definitions for the rate of oxidation reaction are possible as shown in FIG. 6.

In a seventh step 207, a new silicon surface is formed based upon the calculated oxidation rate $dT_{ox}/dt(V_{ox})$ and the time increment Δt as shown in FIG. 6, whereby the spontaneous silicon oxide film is absorbed into a transition region. A thickness $T_{ox}^{trans}$ of the transition region is given by the following equations.

$$T_{ox}^{trans} = T_{ox}^{init} + 0.44 \times \Delta T_{ox} \tag{12}$$

$$= T_{ox}^{init} + 0.44 \times K \times C_{surf} \times \Delta t \tag{13}$$

$$T_{ox}^{trans} = T_{ox}^{init} + 0.44 \times \Delta T_{ox} \tag{14}$$

$$= T_{ox}^{init} + 0.44 \times K \times C_{surf}^{eff} \times \Delta t \tag{15}$$

where 0.44 is a typical value as a ratio in thickness of silicon to be oxidized to silicon oxide. This value 0.44 might be varied in the range of 0.44±10% under various conditions. The value in the range of 0.44±10% may be available as the coefficient in the above equations.

In an eighth step 208, a calculation for deformation is implemented to find a variation in thickness of a silicon oxide film for every one hour as shown in FIG. 6.

In a ninth step 209, it is verified whether or not the time "t" of oxidation calculation reaches a predetermined end time. If the time "t" of oxidation calculation reaches the predetermined end time, then the above process simulation is ended. If, however, the time "t" of oxidation calculation does not reach the predetermined end time, then the process simulation enters into a tenth step 210.

In the tenth step 210, the oxidant diffusion equation is solved for the deformed silicon oxide film to calculate the surface oxidant concentration $C_{surf}$ of the silicon surface to be oxidized before returning to the above fourth step 204. A loop comprising the sequential steps 204 through 210 is repeated until the time "t" of oxidation calculation reaches the predetermined end time.

As described above, the presence of the spontaneous silicon oxide film on a part of silicon exposed to an oxygen atmosphere is assumed as an initial silicon oxide film to calculate an effective surface oxidant concentration on the silicon surface to be oxidized. For this reason, it is unnecessary to set or deposit an initial oxide film which isolates an oxidation-intended part of silicon from the oxygen atmosphere, whereby the process simulation is remarkably improved in facilitation of operation of the process simulator and in convenience in use of the process simulator Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of simulating a process for oxidation of silicon, said method comprising the steps of:

setting a time "t" of oxidation calculation at zero;

calculating an effective surface oxidant concentration of a silicon surface exposed to an oxygen atmosphere assuming that a spontaneous silicon oxide film as an initial silicon oxide film extends over said silicon surface;

forwarding said time "t" of oxidation calculation by a predetermined time increment $\Delta t$;

calculating an oxidation rate by use of one of said effective surface oxidant concentration and said surface oxidant concentration;

forming a new silicon surface based upon said calculated oxidation rate and said time increment $\Delta t$;

finding variations in thickness of said silicon oxide film over time by a deformation calculation;

verifying whether or not said time "t" of oxidation calculation reaches a predetermined end time so that if said time "t" of oxidation calculation reaches said predetermined end time, then a current simulation is ended, whilst if said time "t" of oxidation calculation does not reach said predetermined end time, then an oxidant diffusion equation is solved for a deformed silicon oxide film to calculate said surface oxidant concentration of the silicon surface to be oxidized; and repeating a loop comprising said sequential third to seventh steps until said time "t" of oxidation calculation reaches said predetermined end time.

2. The method as claimed in claim 1, wherein said effective surface oxidant concentration $C_{surf}^{eff}$ of silicon surface exposed to an oxygen atmosphere is found as an equation:

$$C_{surf}^{eff}=C^*/\{(k/h)+1+(kT_{ox}^{init}/D)\}$$

where $C_{surf}^{eff}$ is said effective surface oxidant concentration, $T_{ox}^{init}$ is a thickness of said spontaneous silicon oxide film, $C^*$ is an oxidant concentration of said oxygen atmosphere over said silicon surface, k and h are predetermined reaction coefficients, and D is a diffusion coefficient of oxidant into a silicon oxide film.

3. The method as claimed in claim 1, wherein said effective surface oxidant concentration $C_{surf}^{eff}$ of silicon surface exposed to an oxygen atmosphere is found as an equation:

$$C_{surf}^{eff}=C^*/\{1+(kT_{ox}^{init}/D)\}$$

where $C_{surf}^{eff}$ is said effective surface oxidant concentration, $T_{ox}^{init}$ is a thickness of said spontaneous silicon oxide film, $C^*$ is an oxidant concentration of said oxygen atmosphere over said silicon surface, and D is a diffusion coefficient of oxidant into a silicon oxide film.

4. The method as claimed in claim 1, wherein said time increment $\Delta t$ has previously been determined in consideration of both efficiency and accuracy of an intended simulation.

5. The method as claimed in claim 1, wherein said time increment $\Delta t$ is constant.

6. The method as claimed in claim 1, wherein said time increment $\Delta t$ is varied.

7. The method as claimed in claim 6, wherein said time increment $\Delta t$ is set small in an initial half time period whilst set large in a later half time period.

8. The method as claimed in claim 1, wherein said oxidation rate is calculated by an equation given by:

$$dT_{ox}/dt=K\times C_{surf}^{eff}$$

where $C_{surf}^{eff}$ is an effective surface oxidant concentration, K is a constant, and $T_{ox}$ is a thickness of a silicon oxide film.

9. The method as claimed in claim 1, wherein said oxidation rate is calculated by an equation given by:

$$dT_{ox}/dt=K\times C_{surf}$$

where $C_{surf}$ is a surface oxidant concentration, K is a constant, and $T_{ox}$ is a thickness of a silicon oxide film.

10. The method as claimed in claim 1, wherein a thickness $T_{ox}^{trans}$ of a transition region is given by:

$$T_{ox}^{trans}=T_{ox}^{init}+\alpha\times K\times C_{surf}^{eff}\times\Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}^{eff}$ is said effective surface oxidant concentration.

11. The method as claimed in claim 10, wherein $\alpha$ is set in the range of 0.44±10%.

12. The method as claimed in claim 1, wherein a thickness $T_{ox}^{trans}$ of a transition region is given by:

$$T_{ox}^{trans}=T_{ox}^{init}+\alpha\times K\times C_{surf}\times\Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}$ is a surface oxidant concentration.

13. The method as claimed in claim 12, wherein $\alpha$ is set in the range of 0.44±10%.

14. A method of simulating a process for oxidation of silicon, said method comprising the steps of:

setting a time "t" of oxidation calculation at zero;

calculating both a surface oxidant concentration of a silicon surface for its part thereof unexposed to an oxygen atmosphere and an effective surface oxidant concentration of said silicon surface for its another part exposed to said oxygen atmosphere, assuming that a spontaneous silicon oxide film as an initial silicon oxide film extends over said silicon surface;

forwarding said time "t" of oxidation calculation by a predetermined time increment $\Delta t$;

calculating an oxidation rate by use of said effective surface oxidant concentration;

forming a new silicon surface based upon said calculated oxidation rate and said time increment $\Delta t$;

finding variations in thickness of said silicon oxide film over time by a deformation calculation;

verifying whether or not said time "t" of oxidation calculation reaches a predetermined end time so that if said time "t" of oxidation calculation reaches said predetermined end time, then a current simulation is ended, whilst if said time "t" of oxidation calculation does not reach said predetermined end time, then an oxidant diffusion equation is solved for a deformed silicon oxide film to calculate said surface oxidant concentration of the silicon surface to be oxidized; and repeating a loop comprising said sequential third to seventh steps until said time "t" of oxidation calculation reaches said predetermined end time.

15. The method as claimed in claim 14, further comprising the step of conducting, after said fourth step, a calculation for a maximum rate of oxidation reaction at points where a plurality of definitions for rate of oxidation reaction are given on the same coordinates.

16. The method as claimed in claim 14, wherein said surface oxidant concentration is calculated by solving an oxidant diffusion equation given by:

$$D_{ox}\nabla^2 C_{ox} = dC_{ox}/dt$$

where $D_{ox}$ is the diffusion coefficient of oxidant in oxide film, $\nabla^2$ is the Laplacean, and $C_{ox}$ is the oxidant concentration.

17. The method as claimed in claim 16, wherein said oxidant diffusion equation is approximated to be $$D_{ox}\nabla^2 C_{ox} \approx 0.$$

18. The method as claimed in claim 14, wherein said effective surface oxidant concentration $C_{surf}^{eff}$ of silicon surface exposed to said oxygen atmosphere is found as an equation:

$$C_{surf}^{eff} = C^*/\{(k/h)+1+(kT_{ox}^{init}/D)\}$$

where $C_{surf}^{eff}$ is said effective surface oxidant concentration, $T_{ox}^{init}$ is a thickness of said spontaneous silicon oxide film, $C^*$ is an oxidant concentration of said oxygen atmosphere over said silicon surface, k and h are predetermined reaction coefficients, and D is a diffusion coefficient of oxidant into a silicon oxide film.

19. The method as claimed in claim 14, wherein said effective surface oxidant concentration $C_{surf}^{eff}$ of silicon surface exposed to an oxygen atmosphere is found as an equation:

$$C_{surf}^{eff} = C^*/\{1+(kT_{ox}^{init}/D)\}$$

where $C_{surf}^{eff}$ is said effective surface oxidant concentration, $T_{ox}^{init}$ is a thickness of said spontaneous silicon oxide film, $C^*$ is an oxidant concentration of said oxygen atmosphere over said silicon surface, and D is a diffusion coefficient of oxidant into a silicon oxide film.

20. The method as claimed in claim 14, wherein said time increment $\Delta t$ has previously been determined in consideration of both efficiency and accuracy of an intended simulation.

21. The method as claimed in claim 14, wherein said time increment $\Delta t$ is constant.

22. The method as claimed in claim 14, wherein said time increment $\Delta t$ is varied.

23. The method as claimed in claim 22, wherein said time increment $\Delta t$ is set small in an initial half time period whilst set large in a later half time period.

24. The method as claimed in claim 14, wherein said oxidation rate is calculated by an equation given by:

$$dT_{ox}/dt = K \times C_{surf}^{eff}$$

where $C_{surf}^{eff}$ is said effective surface oxidant concentration, K is a constant, and $T_{ox}$ is a thickness of a silicon oxide film.

25. The method as claimed in claim 14, wherein said oxidation rate is calculated by an equation given by $$dT_{ox}/dt = K \times C_{surf}$$

where $C_{surf}$ is said surface oxidant concentration, K is a constant, and $T_{ox}$ is a thickness of a silicon oxide film.

26. The method as claimed in claim 14, wherein a thickness $T_{ox}^{trans}$ of a transition region is given by:

$$T_{ox}^{trans} = T_{ox}^{init} + \alpha \times K \times C_{surf}^{eff} \times \Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}^{eff}$ is said effective surface oxidant concentration.

27. The method as claimed in claim 26, wherein $\alpha$ is set in the range of 0.44±10%.

28. The method as claimed in claim 14, wherein a thickness $T_{ox}^{trans}$ of a transition region is given by:

$$T_{ox}^{trans} = T_{ox}^{init} + \alpha \times K \times C_{surf} \times \Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}$ is a surface oxidant concentration.

29. The method as claimed in claim 28, wherein $\alpha$ is set in the range 0.44±10%.

30. A computer-readable storage medium having stored a computer program for simulating a process for oxidation of silicon, said computer program including the steps of:

setting a time "t" of oxidation calculation at zero;

calculating an effective surface oxidant concentration of a silicon surface exposed to an oxygen atmosphere assuming that a spontaneous silicon oxide film as an initial silicon oxide film extends over said silicon surface;

forwarding said time "t" of oxidation calculation by a predetermined time increment $\Delta t$;

calculating an oxidation rate by use of one of said effective surface oxidant concentration and said surface oxidant concentration;

forming a new silicon surface based upon said calculated oxidation rate and said time increment $\Delta t$;

finding variations in thickness of said silicon oxide film over time by a deformation calculation;

verifying whether or not said time "t" of oxidation calculation reaches a predetermined end time so that if said time "t" of oxidation calculation reaches said predetermined end time, then a current simulation is ended, whilst if said time "t" of oxidation calculation does not reach said predetermined end time, then an oxidant diffusion equation is solved for a deformed silicon oxide film to calculate said surface oxidant concentration of the silicon surface to be oxidized; and repeating a loop comprising said sequential third to seventh steps until said time "t" of oxidation calculation reaches said predetermined end time.

31. The computer-readable storage medium as claimed in claim 30, wherein said effective surface oxidant concentration $C_{surf}^{eff}$ of silicon surface exposed to an oxygen atmosphere is found as an equation:

$$C_{surf}^{eff} = C^*/\{(k/h)+1+(kT_{ox}^{init}/D)\}$$

where $C_{surf}^{eff}$ is said effective surface oxidant concentration, $T_{ox}^{init}$ is a thickness of said spontaneous silicon oxide film, C* is an oxidant concentration of said oxygen atmosphere over said silicon surface, k and h are predetermined reaction coefficients, and D is a diffusion coefficient of oxidant into a silicon oxide film.

32. The computer-readable storage medium as claimed in claim 30, wherein said effective surface oxidant concentration $C_{surf}^{eff}$ of silicon surface exposed to an oxygen atmosphere is found as an equation:

$$C_{surf}^{eff}=C^*/\{1+(kT_{ox}^{init}/D)\}$$

where $C_{surf}^{eff}$ is said effective surface oxidant concentration, $T_{ox}^{init}$ is a thickness of said spontaneous silicon oxide film, C* is an oxidant concentration of said oxygen atmosphere over said silicon surface, and D is a diffusion coefficient of oxidant into a silicon oxide film.

33. The computer-readable storage medium as claimed in claim 30, wherein said time increment $\Delta t$ has previously been determined in consideration of both efficiency and accuracy of an intended simulation.

34. The computer-readable storage medium as claimed in claim 30, wherein said time increment $\Delta t$ is constant.

35. The computer-readable storage medium as claimed in claim 30, wherein said time increment $\Delta t$ is varied.

36. The computer-readable storage medium as claimed in claim 35, wherein said time increment $\Delta t$ is set small in an initial half time period whilst set large in a later half time period.

37. The computer-readable storage medium as claimed in claim 30, wherein said oxidation rate is calculated by an equation given by:

$$dT_{ox}/dt=K\times C_{surf}^{eff}$$

where $C_{surf}^{eff}$ is an effective surface oxidant concentration, K is a constant, and $T_{ox}$ is a thickness of a silicon oxide film.

38. The computer-readable storage medium as claimed in claim 30, wherein said oxidation rate is calculated by an equation given by:

$$dT_{ox}/dt=K\times C_{surf}$$

where $C_{surf}$ is a surface oxidant concentration, K is a constant, and $T_{ox}$ is a thickness of a silicon oxide film.

39. The computer-readable storage medium as claimed in claim 30, wherein a thickness $T_{ox}^{trans}$ of a transition region is given by:

$$T_{ox}^{trans}=T_{ox}^{init}+\alpha\times K\times C_{surf}^{eff}\times\Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}^{eff}$ is said effective surface oxidant concentration.

40. The computer-readable storage medium as claimed in claim 39, wherein $\alpha$ is set in the range of 0.44±10%.

41. The computer-readable storage medium as claimed in claim 30, wherein a thickness $T_{ox}^{trans}$ of a transition region is given by:

$$T_{ox}^{trans}=T_{ox}^{init}+\alpha\times K\times C_{surf}\times\Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}$ is a surface oxidant concentration.

42. The computer-readable storage medium as claimed in claim 41, wherein $\alpha$ is set in the range of 0.44±10%.

43. A computer-readable storage medium having stored a computer program for simulating a process for oxidation of silicon, said computer program including the steps of:

setting a time "t" of oxidation calculation at zero;

calculating both a surface oxidant concentration of a silicon surface for its part thereof unexposed to an oxygen atmosphere and an effective surface oxidant concentration of said silicon surface for its another part exposed to said oxygen atmosphere, assuming that a spontaneous silicon oxide film as an initial silicon oxide film extends over said silicon surface;

forwarding said time "t" of oxidation calculation by a predetermined time increment $\Delta t$;

calculating an oxidation rate by use of said effective surface oxidant concentration;

forming a new silicon surface based upon said calculated oxidation rate and said time increment $\Delta t$;

finding variations in thickness of said silicon oxide film over time by a deformation calculation;

verifying whether or not said time "t" of oxidation calculation reaches a predetermined end time so that if said time "t" of oxidation calculation reaches said predetermined end time, then a current simulation is ended, whilst if said time "t" of oxidation calculation does not reach said predetermined end time, then an oxidant diffusion equation is solved for a deformed silicon oxide film to calculate said surface oxidant concentration of the silicon surface to be oxidized; and repeating a loop comprising said sequential third to seventh steps until said time "t" of oxidation calculation reaches said predetermined end time.

44. The computer-readable storage medium as claimed in claim 43, wherein said computer program further includes the step of conducting, after said fourth step, a calculation for a maximum rate of oxidation reaction at points where a plurality of definitions for rate of oxidation reaction are given on the same coordinates.

45. The computer-readable storage medium as claimed in claim 43, wherein said surface oxidant concentration is calculated by solving an oxidant diffusion equation given by:

$$D_{ox}\nabla^2 C_{ox}=dC_{ox}/dt$$

where $D_{ox}$ is the diffusion coefficient of oxidant in oxide film, $\nabla^2$ is the Laplacean, and $C_{ox}$ is the oxidant concentration.

46. The computer-readable storage medium as claimed in claim 45, wherein said oxidant diffusion equation is approximated to be $$D_{ox}\nabla^2 C_{ox}\approx 0.$$

47. The computer-readable storage medium as claimed in claim 43, wherein said effective surface oxidant concentration $C_{surf}^{eff}$ of silicon surface exposed to said oxygen atmosphere is found as an equation:

$$C_{surf}^{eff}=C^*/\{(k/h)+1+(kT_{ox}^{init}/D)\}$$

where $C_{surf}^{eff}$ is said effective surface oxidant concentration, $T_{ox}^{init}$ is a thickness of said spontaneous silicon oxide film, C* is an oxidant concentration of said oxygen atmosphere over said silicon surface, k and h are predetermined reaction coefficients, and D is a diffusion coefficient of oxidant into a silicon oxide film.

48. The computer-readable storage medium as claimed in claim 43, wherein said effective surface oxidant concentration $C_{surf}^{eff}$ of silicon surface exposed to an oxygen atmosphere is found as an equation:

$$C_{surf}^{eff}=C^*/\{1+(kT_{ox}^{init}/D)\}$$

where $C_{surf}^{eff}$ is said effective surface oxidant concentration, $T_{ox}^{init}$ is a thickness of said spontaneous silicon oxide film, $C^*$ is an oxidant concentration of said oxygen atmosphere over said silicon surface, and D is a diffusion coefficient of oxidant into a silicon oxide film.

49. The computer-readable storage medium as claimed in claim 43, wherein said time increment $\Delta t$ has previously been determined in consideration of both efficiency and accuracy of an intended simulation.

50. The computer-readable storage medium as claimed in claim 43, wherein said time increment $\Delta t$ is constant.

51. The computer-readable storage medium as claimed in claim 43, wherein said time increment $\Delta t$ is varied.

52. The computer-readable storage medium as claimed in claim 51, wherein said time increment $\Delta t$ is set small in an initial half time period whilst set large in a later half time period.

53. The computer-readable storage medium as claimed in claim 43, wherein said oxidation rate is calculated by an equation given by:

$$dT_{ox}/dt=K\times C_{surf}^{eff}$$

where $C_{surf}^{eff}$ is said effective surface oxidant concentration, K is a constant, and $T_{ox}$ is a thickness of a silicon oxide film.

54. The computer-readable storage medium as claimed in claim 43, wherein said oxidation rate is calculated by an equation given by:

$$dT_{ox}/dt=K\times C_{surf}$$

where $C_{surf}$ is said surface oxidant concentration, K is a constant, and $T_{ox}$ is a thickness of a silicon oxide film.

55. The computer-readable storage medium as claimed in claim 43, wherein a thickness $T_{ox}^{trans}$ of a transition region is given by:

$$T_{ox}^{trans}=T_{ox}^{init}+\alpha\times K\times C_{surf}^{eff}\times\Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}^{eff}$ is said effective surface oxidant concentration.

56. The computer-readable storage medium as claimed in claim 55, wherein $\Delta$ is set in the range of 0.44±10%.

57. The computer-readable storage medium as claimed in claim 43, wherein a thickness $T_{ox}^{trans}$ of a transition region is given by:

$$T_{ox}^{trans}=T_{ox}^{trans}+\alpha\times K\times C_{surf}\times\Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}$ is a surface oxidant concentration.

58. The computer-readable storage medium as claimed in claim 57, wherein $\alpha$ is set in the range of 0.44±10%.

59. A process simulator for a simulation of a process for oxidation of silicon, said process simulator including a processing unit and a storage unit which has stored a computer program for causing said processing unit to perform said simulation by the steps of:

setting a time "t" of oxidation calculation at zero;

calculating an effective surface oxidant concentration of a silicon surface exposed to an oxygen atmosphere assuming that a spontaneous silicon oxide film as an initial silicon oxide film extends over said silicon surface;

forwarding said time "t" of oxidation calculation by a predetermined time increment $\Delta t$;

calculating an oxidation rate by use of one of said effective surface oxidant concentration and said surface oxidant concentration;

forming a new silicon surface based upon said calculated oxidation rate and said time increment $\Delta t$;

finding variations in thickness of said silicon oxide film over time by a deformation calculation;

verifying whether or not said time "t" of oxidation calculation reaches a predetermined end time so that if said time "t" of oxidation calculation reaches said predetermined end time, then a current simulation is ended, whilst if said time "t" of oxidation calculation does not reach said predetermined end time, then an oxidant diffusion equation is solved for a deformed silicon oxide film to calculate said surface oxidant concentration of the silicon surface to be oxidized; and repeating a loop comprising said sequential third to seventh steps until said time "t" of oxidation calculation reaches said predetermined end time.

60. The process simulator as claimed in claim 59, wherein said effective surface oxidant concentration $C_{surf}^{eff}$ of silicon surface exposed to an oxygen atmosphere is found as an equation:

$$C_{surf}^{eff}=C^*/\{(k/h)+1+(kT_{ox}^{init}/D)\}$$

where $C_{surf}^{eff}$ is said effective surface oxidant concentration, $T_{ox}^{init}$ is a thickness of said spontaneous silicon oxide film, $C^*$ is an oxidant concentration of said oxygen atmosphere over said silicon surface, k and h are predetermined reaction coefficients, and D is a diffusion coefficient of oxidant into a silicon oxide film.

61. The process simulator as claimed in claim 59, wherein said effective surface oxidant concentration $C_{surf}^{eff}$ of silicon surface exposed to an oxygen atmosphere is found as an equation:

$$C_{surf}^{eff}=C^*/\{1+(kT_{ox}^{init}/D)\}$$

where $C_{surf}^{eff}$ is said effective surface oxidant concentration, $T_{ox}^{init}$ is a thickness of said spontaneous silicon oxide film, $C^*$ is an oxidant concentration of said oxygen atmosphere over said silicon surface, and D is a diffusion coefficient of oxidant into a silicon oxide film.

62. The process simulator as claimed in claim 59, wherein said time increment $\Delta t$ has previously been determined in consideration of both efficiency and accuracy of an intended simulation.

63. The process simulator as claimed in claim 59, wherein said time increment $\Delta t$ is constant.

64. The process simulator as claimed in claim 59, wherein said time increment $\Delta t$ is varied.

65. The process simulator as claimed in claim 64, wherein said time increment $\Delta t$ is set small in an initial half time period whilst set large in a later half time period.

66. The process simulator as claimed in claim 59, wherein said oxidation rate is calculated by an equation given by:

$$dT_{ox}/dt=K\times C_{surf}^{eff}$$

where $C_{surf}^{eff}$ is an effective surface oxidant concentration, K is a constant, and $T_{ox}$ is a thickness of a silicon oxide film.

67. The process simulator as claimed in claim 59, wherein said oxidation rate is calculated by an equation given by:

$$dT_{ox}/dt=K \times C_{surf}$$

where $C_{surf}$ is a surface oxidant concentration, K is a constant, and $T_{ox}$ is a thickness of a silicon oxide film.

68. The process simulator as claimed in claim 59, wherein a thickness $T_{ox}^{trans}$ of a transition region is given by:

$$T_{ox}^{trans}=T_{ox}^{init}+\alpha \times K \times C_{surf}^{eff} \times \Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}^{eff}$ is said effective surface oxidant concentration.

69. The process simulator as claimed in claim 59, wherein $\alpha$ is set in the range of 0.44±10%.

70. The process simulator as claimed in claim 59, wherein a thickness $T_{ox}^{trans}$ of a transition region is given by:

$$T_{ox}^{trans}=T_{ox}^{init}+\alpha \times K \times C_{surf} \times \Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}$ is a surface oxidant concentration.

71. The process simulator as claimed in claim 70, wherein $\alpha$ is set in the range of 0.44±10%.

72. A process simulator for a simulation of a process for oxidation of silicon, said process simulator including a processing unit and a storage unit which has stored a computer program for causing said processing unit to perform said simulation by the steps of:

setting a time "t" of oxidation calculation at zero;

calculating both a surface oxidant concentration of a silicon surface for its part thereof unexposed to an oxygen atmosphere and an effective surface oxidant concentration of said silicon surface for its another part exposed to said oxygen atmosphere, assuming that a spontaneous silicon oxide film as an initial silicon oxide film extends over said silicon surface;

forwarding said time "t" of oxidation calculation by a predetermined time increment $\Delta t$;

calculating an oxidation rate by use of said effective surface oxidant concentration;

forming a new silicon surface based upon said calculated oxidation rate and said time increment $\Delta t$;

finding variations in thickness of said silicon oxide film over time by a deformation calculation;

verifying whether or not said time "t" of oxidation calculation reaches a predetermined end time so that if said time "t" of oxidation calculation reaches said predetermined end time, then a current simulation is ended, whilst if said time "t" of oxidation calculation does not reach said predetermined end time, then an oxidant diffusion equation is solved for a deformed silicon oxide film to calculate said surface oxidant concentration of the silicon surface to be oxidized; and repeating a loop comprising said sequential third to seventh steps until said time "t" of oxidation calculation reaches said predetermined end time.

73. The process simulator as claimed in claim 72, wherein said simulation further includes the step of conducting, after said fourth step, a calculation for a maximum rate of oxidation reaction at points where a plurality of definitions for rate of oxidation reaction are given on the same coordinates.

74. The process simulator as claimed in claim 72, wherein said surface oxidant concentration is calculated by solving an oxidant diffusion equation given by:

$$D_{ox}\nabla^2 C_{ox}=dC_{ox}/dt$$

where $D_{ox}$ is the diffusion coefficient of oxidant in oxide film, $\nabla^2$ is the Laplacean, and $C_{ox}$ is the oxidant concentration.

75. The process simulator as claimed in claim 74, wherein said oxidant diffusion equation is approximated to be $$D_{ox}\nabla_2 C_{ox} \approx 0.$$

76. The process simulator as claimed in claim 72, wherein said effective surface oxidant concentration $C_{surf}^{eff}$ of silicon surface exposed to said oxygen atmosphere is found as an equation:

$$C_{surf}^{eff}=C^*/\{(k/h)+1+(kT_{ox}^{init}/D)\}$$

where $C_{surf}^{eff}$ is said effective surface oxidant concentration, $T_{ox}^{init}$ is a thickness of said spontaneous silicon oxide film, $C^*$ is an oxidant concentration of said oxygen atmosphere over said silicon surface, k and h are predetermined reaction coefficients, and D is a diffusion coefficient of oxidant into a silicon oxide film.

77. The process simulator as claimed in claim 72, wherein said effective surface oxidant concentration $C_{surf}^{eff}$ of silicon surface exposed to an oxygen atmosphere is found as an equation:

$$C_{surf}^{eff}=C^*/\{1+(kT_{ox}^{init}/D)\}$$

where $C_{surf}^{eff}$ is said effective surface oxidant concentration, $T_{ox}^{init}$ is a thickness of said spontaneous silicon oxide film; $C^*$ is an oxidant concentration of said oxygen atmosphere over said silicon surface, and D is a diffusion coefficient of oxidant into a silicon oxide film.

78. The process simulator as claimed in claim 72, wherein said time increment $\Delta t$ has previously been determined in consideration of both efficiency and accuracy of an intended simulation.

79. The process simulator as claimed in claim 72, wherein said time increment $\Delta t$ is constant.

80. The process simulator as claimed in claim 72, wherein said time increment $\Delta t$ is varied.

81. The process simulator, as claimed in claim 80, wherein said time increment $\Delta t$ is set small in an initial half time period whilst set large in a later half time period.

82. The process simulator as claimed in claim 72, wherein said oxidation rate is calculated by an equation given by:

$$dT_{ox}/dt=K \times C_{surf}^{eff}$$

where $C_{surf}^{eff}$ is said effective surface oxidant concentration, K is a constant, and $T_{ox}$ is a thickness of a silicon oxide film.

83. The process simulator as claimed in claim 72, wherein said oxidation rate is calculated by an equation given by:

$$dT_{ox}/dt=K \times C_{surf}$$

where $C_{surf}$ is said surface oxidant concentration, K is a constant, and $T_{ox}$ is a thickness of a silicon oxide film.

84. The process simulator as claimed in claim 72, wherein a thickness $T_{ox}^{trans}$ of a transition region is given by $$T_{ox}^{trans}=T_{ox}^{init}+\alpha \times K \times C_{surf}^{eff} \times \Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}^{eff}$ is said effective surface oxidant concentration.

85. The process simulator as claimed in claim 84, wherein $\alpha$ is set in the range of 0.44±10%.

86. The process simulator as claimed in claim 72, wherein a thickness $T_{ox}^{trans}$ of a transition region is given by:

$$T_{ox}^{trans}=T_{ox}^{init}+\alpha \times K \times C_{surf} \times \Delta t$$

where $T_{ox}^{trans}$ is a thickness of said transition region, $\alpha$ is a ratio in thickness of silicon to silicon oxide, $T_{ox}^{init}$ is a thickness of said spontaneous silicon oxide film, K is a constant and $C_{surf}$ is a surface oxidant concentration.

87. The process simulator as claimed in claim 86, wherein $\alpha$ is set in the range of 0.44±10%.

\* \* \* \* \*